(12) United States Patent
Yadlowsky

(10) Patent No.: US 6,341,033 B1
(45) Date of Patent: Jan. 22, 2002

(54) PERFORMANCE GAIN FLATTENED ERBIUM-DOPED FIBER AMPLIFIERS

(75) Inventor: Michael J. Yadlowsky, Corning, NY (US)

(73) Assignee: Corning incorporated

( * ) Notice: Subject to any disclaimer, the term of this patent is extended or adjusted under 35 U.S.C. 154(b) by 0 days.

(21) Appl. No.: 09/721,255

(22) Filed: Nov. 22, 2000

Related U.S. Application Data

(62) Division of application No. 09/280,440, filed on Mar. 29, 1999, now Pat. No. 6,215,581.
(60) Provisional application No. 60/080,127, filed on Mar. 31, 1998.

(51) Int. Cl.$^7$ .............................. H04J 14/02; H01S 3/06; G02F 1/35
(52) U.S. Cl. .................. 359/337.2; 359/173; 359/337.4
(58) Field of Search ........................... 359/337.2, 337.4, 359/134, 173

(56) References Cited

U.S. PATENT DOCUMENTS

| | | | |
|---|---|---|---|
| 5,838,487 A | * 11/1998 | Nilsson et al. | 359/341 |
| 5,912,750 A | * 6/1999 | Takeda et al. | 359/124 |
| 6,151,158 A | * 11/2000 | Takeda et al. | 359/341 |
| 6,222,655 C1 | * 4/2001 | Terahara | 359/124 |

FOREIGN PATENT DOCUMENTS

| EP | 0695050 | 1/1996 |
|---|---|---|

OTHER PUBLICATIONS

Tachibana et al., "Erbium–doped fiber amplification with flattened gain spectrum, " *IEEE Photonics Technology Letters*, vol. 3, pp. 118–120, 1991.
Giles et al., "Spectral dependence of gain and noise in Erbium–doped fiber amplifiers," *IEEE Photonics Technology Letters*, vol. 2, p. 797–800, 1990.
Nilsson et al., "Erbium–doped fiber amplifier with dynamic gain flatness for WDM," *Electronic Letters,*vol. 31, p. 1578–1579, 1995.
Jolley et al., "Out–of–band electronic gain clamping for a variable gain and output power EDFA with low dynamic gain tilt," in Conference on Optical Fiber Communication, 1997 OSA Technical Digest Series, vol. 6, p. 134–135.
Sugaya et al., "Novel Configuration For Low Noise and Wide–Dynamic–Range Er–doped Fiber Amplifier For WDM Systems." OAA '95, paper FC3, Davos, Switzerland, 4pp., esp. Fig 3b.
Oda et al. "10–Channel x 10–Gbits/s Optical FDM." '95 Technical Digest, TuH1, 2pp.
Delavaux et al., "Optimized Two–Stage–In–Line Balanced Optical Amplifier Design", Optical Fiber Technology 1, 1995, pp. 239–243.
Desurvive, E., "Lightwave Communications: The Fifth Generation", Scientific American, Jan. 1992, pp. 114–121.
Toba et al, "A 100–channel optical FDM six–stage in–line amplifier system employing tunable gain equalizers", *IEEE Photonics Technology Letters*, vol. 5, No. 2, Feb. 1993, pp. 248–251.
Lebref et al, "Study of an 8x2.5Gbit/s experimental WDM transmission system with gain stabilized and equalized erbium doped fibre amplifiers", ECOC '97, Pub. No. 448, pp. 37–40.
Kinoshita et al, "Low–noise and wide–dynamic–range erbium doped fiber amplifiers with automatic level control for WDM transmission systems", OSA Trends in Optics and Photonics, vol. 5, 1996, pp. 49–52.
Tobe et al, IEEE Photonsis Tech. Letters, vol. 5, #2, Feb. 1993, pp 248–251.*

* cited by examiner

*Primary Examiner*—Nelson Moskowitz
(74) *Attorney, Agent, or Firm*—Svetlana Z Short

(57) ABSTRACT

The invention is directed to a multistage optical amplifier having a gain stage between two gain flattening filters. According to illustrative embodiments, a gain flattened optical amplifier system comprises a plurality of optical gain stages and a plurality of gain flattening filter stages arranged serially in an alternating manner.

6 Claims, 1 Drawing Sheet

FIG. 1
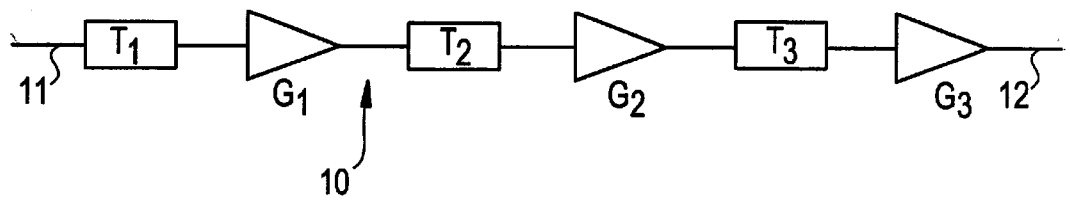
FIG. 2A
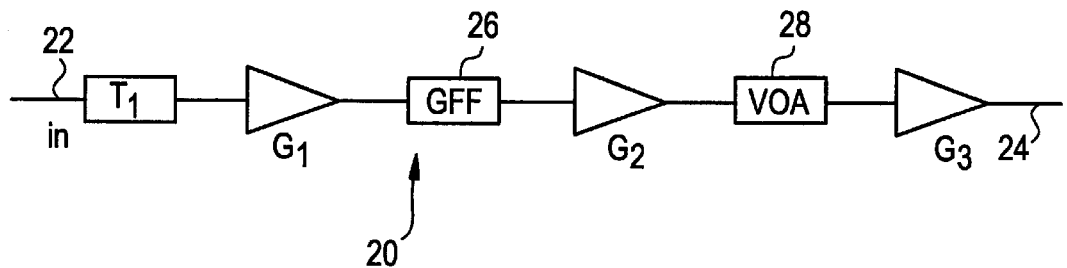
FIG. 2B
FIG. 3
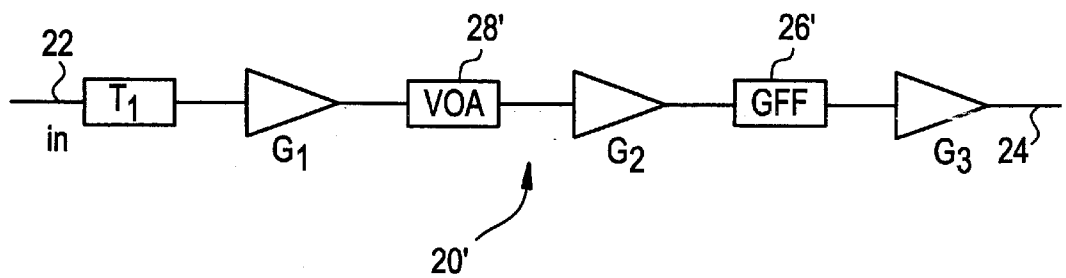
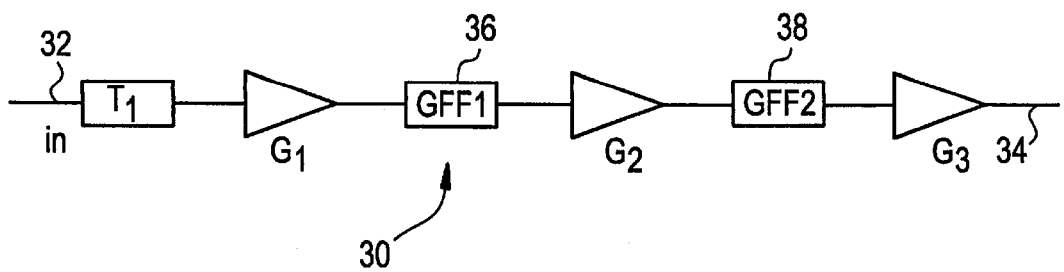

PERFORMANCE GAIN FLATTENED ERBIUM-DOPED FIBER AMPLIFIERS

RELATED APPLICATIONS

This application is a Divisional of allowed Application No. 09/280,440, filed Mar. 29, 1999, now U.S. Pat. No. 6,215,581, entitled "IMPROVED PERFORMANCE GAIN FLATTENNED EDFA", which claims U.S. Provisional Application No. 60/080,127, filed Mar. 31, 1998. Both of which are hereby incorporated by reference.

FIELD OF THE INVENTION

The present invention relates to a technique for improving the performance of a multistage Erbium Doped Fiber Amplifier (EDFA) which contains a gain flattening filter (GFF) and possibly other lossy components including a variable optical attenuator (VOA).

BACKGROUND OF THE INVENTION

It is important for an optical amplifier used in a wavelength-multiplexed-communication system to have a uniform or flat gain spectrum. An EDFA can produce gain over a spectral width of more than 30 nm, but even under optimum pumping conditions the gain spectrum may not be uniform. A gain flattening filter (GFF) is known to be useful in optical amplifiers to reduce the variation in the gain over some band of wavelengths (see e.g., M. Tachibana, R. I. Laming, P. R. Morkel, and D. N. Payne, "Erbium-doped fiber amplification with flattened gain spectrum," IEEE Photonics Technology Letters, vol.3, pp. 118–120, 1991). Static GFFs, however, can only provide optimum gain-flatness at a single gain value (i.e., gain at any particular wavelength). If the gain of an EDFA is changed by changing the inversion (e.g., by changing the pumping power or signal power), the gain changes in a spectrally dependent manner pumping power or signal power (see, e.g., C. R. Giles and D. J. D. Giovanni, "Spectral dependence of gain and noise in Erbium-doped fiber amplifiers," IEEE Photonics Technology Letters, vol. 2, pp. 797–800, 1990 and J. Nilsson, Y. W. Lee, and W. H. Choe, "Erbium doped fiber amplifier with dynamic gain flatness for WDM," Electronic Letters vol. 31, pp. 1578–1579, 1995). As a result, if a conventional EDFA is used in an application where its gain needs to be different from the design gain of the amplifier, its gain spectrum will show excess normalized gain ripple ((maximum gain—minimum gain)/minimum gain) as calculated in the wavelength band of interest. An example of how this can be a problem is provided by an optically amplified fiber transmission system where one needs to support fiber spans shorter than those for which the amplifier is designed. It is typically impractical to have separate amplifiers custom designed for each fiber span. Therefore, one is either forced to have an amplifier with a distorted gain spectrum or to add enough loss to the system so that the design gain is actually needed from the amplifier. An optical attenuator intentionally added to a system for gain-flattening purposes will tend to increase the amount of noise that is added to the signal and require additional pump power relative to a similar cascade of amplifiers that have been redesigned to provide flat gain at the actual gain level needed. This performance loss can be reduced by placing the added optical attenuation between the gain stages of a multistage optical amplifier (see, e.g., Y. Sugaya, S. Kinoshita, and T. Chikama, "Novel configuration for low-noise and wide-dyanmnic-range Er-doped fiber amplifier for. WDM systems," in Optical Amplifiers and their Applications, 1995 OSA Technical Digest Series, Vol. (Optical Society of America, Washington, D.C.) 158–161 and N. E. Jolley, F. Davis, and J. Mun, "Out-of-band electronic gain clamping for a variable gain and output power EDFA with low dynamic gain tilt," in Conference on Optical Fiber Communication, 1997 OSA Technical Digest series, Vol. 6, (Optical Society of America, Washington, D.C.) 134–135).

It is an object of the invention to utilize this approach of placing attenuation between gain stages in an amplifier that contains a GFF, while maintaining good optical performance. This is especially important for wideband EDFA's where the GFF needed may attenuate only parts of the gain spectrum. This approach is also applicable when a high attenuation GFF is used alone or with other attenuating optical elements.

It is well known that the impact that a GFF has on the performance of an optical amplifier can be reduced by properly inserting the GFF between two gain stages (see e.g., M. Tachibana, R. I. Laming, P. R. Morkel, and D. N. Payne, "Erbium-doped fiber amplification with flattened gain spectrum," IEEE Photonics Technology Letters, vol. 3, pp. 118–120, 1991). For a conventional line amplifier the negative impact of the GFF can be significantly reduced with proper filter placement. However, as amplifiers move toward wider bandwidths, the impact of the GFF becomes more significant for a number of reasons. Wider bandwidths tend to require GFFs with larger peak attenuations. As the peak attenuation of a filter increases, its negative impact on amplifier noise/output power performance will generally increase also. Wide bandwidth amplifiers also frequently make use of the short wavelength portion of the erbium gain spectrum (or "blueband") which roughly extends from 1525–1540 nm. It is typically harder to achieve optimum noise performance in this part of the spectrum since the intrinsic noise performance of the amplifying fiber is more sensitive to the local inversion. As illustrated below, these effects can compound each other in multistage amplifiers where the final power stages may have very low inversions.

More particularly, FIG. 1 schematically illustrates a three stage EDFA 10. An optical signal to be amplified enters the EDFA 10 at input port 11 and the amplified optical signal exits the EDFA at output port 12. The EDFA 10 includes three gain stages whose power gains are designated as $G_1$, $G_2$, $G_3$. Each of the gain stages $G_1$, $G_2$, $G_3$ comprises a pumped segment of erbium doped optical fiber. The erbium dopant provides optical gain for optical radiation propagating in the optical fiber segment. Alternatively, it may be possible for other elements besides erbium, such as the rare earth elements, to provide the appropriate gain.

In FIG. 1, $T_i$ is the net (linear) transmittance up to the ith gain stage. Therefore, $T_i$ is the product of the linear transmittance factors of lossy components and the gain factor for amplifying components. Thus, $T_i$ may be viewed as the power transmission coefficient (accounting for insertion loss) for all components with the indicated position relative to the gain stages, $G_i$, i=1, 2, 3. The quantities $T_i$ and $G_i$ may be a function of wavelength.

$$F_{total} = \frac{F_1}{T_{in-1}} + \frac{F_2}{T_{in-2}} + \frac{F_3}{T_{in-3}} \tag{1}$$

where $F_1$ is the noise factor (linear units) of the first gain stage and $T_{in-1}$ is the net linear power transmittance of all the optical components from the amplifier input to the beginning of the first gain stage. The symbols associated with the noise contributions of the other stages are analogously defined. For a high gain amplifier (G>~20 dB) the minimum possible value of $F_1$ is 2. One typically designs optical amplifiers such that the first term in Eqn. 1 dominates the total noise factor while operating with $F_1$ as close to the quantum mechanical limit as possible (high population inversion). Because of the low inversions typically used in subsequent gain stages (high pump to signal power conversion efficiency is typically easiest for attaining a lower inversion), the only way to make the impact of these stages on the overall amplifier noise factor small is to make $$T_{in-1} = T_1 G_1 + \ldots + T_{i-1} G_{i-1} \qquad (2)$$

i.e., the net power transmission factor from the amplifier input to the beginning of the ith stage, as high as possible. This can typically be accomplished by using a high gain (~20 dB) in the first stage. Higher gains are difficult to attain with a single stage due to the buildup of amplified spontaneous emission. However, GFF peak attenuations for wide band amplifiers frequently approach or exceed 10 dB while a 10 dB gain dynamic range would require a (variable) optical attenuator with a peak attenuation>10 dB (10 working range+minimum loss). Furthermore, the noise factor of the low inversion stages can be in a range from near 10 to larger than 10. If components with insertion losses such as these are immediately cascaded within the amplifier, their aggregate attenuation would result in low values for $T_{in-i}$ and the overall noise factor of the amplifier would be affected.

It is a further object of the invention to overcome this problem so as to improve the performance of a multistage EDFA.

SUMMARY OF THE INVENTION

In accordance with a preferred embodiment of the invention, the above-described problem of the prior art is reduced and an improved multistage optical amplifier is achieved.

More specifically, in accordance with an illustrative embodiment of the present invention, an optical amplifier system comprises multiple gain stages arranged serially for providing gain to an optical signal propagating therein. The optical amplifier also includes at least two gain flattening filters for reducing a variation in gain of the optical amplifier system in a particular wavelength band. One of the gain stages is located between the two gain flattening filters to reduce an overall noise factor of the optical amplifier system.

BRIEF DESCRIPTION OF THE DRAWINGS

FIG. 1 schematically illustrates a multistage EDFA.

FIG. 2A schematically illustrates a multistage EDFA with a variable optical attenuator (VOA) separated from a GFF by a gain stage and in which the GFF precedes the VOA in the direction of propagation of the optical signal, in accordance with one embodiment of the invention.

FIG. 2B schematically illustrates a multistage EDFA with a VOA separated from a GFF and in which the VOA precedes the GFF in the direction of propagation of the optical signal, in accordance with a second embodiment of the invention.

FIG. 3 illustrates a multistage EDFA comprising a first GFF preceding a gain element and a second GFF following the gain element.

DETAILED DESCRIPTION OF THE INVENTION

FIG. 2A illustrates an optical amplifier system in accordance with an illustrative embodiment of the present invention. The optical amplifier 20 includes an input port 22 through which optical radiation to be amplified enters the system and an output port 24 through which amplified radiation leaves the amplifier system. Illustratively, the amplified optical radiation has a wavelength in the range of the erbium gain band, e.g., 1530–1560, though it could be much wider than this.

The amplifier system 20 comprises three gain stages whose power gains are designated $G_1$, $G_2$, $G_3$. Illustratively, each gain stage comprises an Erbium doped optical fiber amplifier. Such an amplifier is disclosed in U.S. Pat. No. 5,710,659. The stage $G_1$ typically has relatively high gain (15–20 dB). The other stages would likely have lower gains; stage $G_2$ roughly 10–15 dB, stage $G_3$, 5–10 dB. These values depend highly on the amount of attenuation contained within components inside the amplifier (such as GFF and VOA, but also other components such as dispersion compensators, optical add/drops) and the choice of the gain band (wide gain bands will require GFFs with higher peak attenuation.) $T_i$ represents the power transmission coefficients of any optical components between the input port 22 and the first gain stage $G_1$. (In many cases, there may be no such components.) A GFF 26 is located between gain stages $G_1$ and $G_2$. The GFF has a peak attenuation of 10 dB, for example. GFF peak attenuation depends on width of bands, and how much gain is provided by the erbium fiber which is the external gain provided by the amplifier minus the total attenuation of all components. A peak attenuation of 10 dB can be had for the range 1530 nm to 1560 nm for total erbium gain of 40 dB or more, for the types of erbium doped fiber typically used. An attenuating element 28 is located between gain stages $G_2$ and $G_3$. The attenuating element 28 may include an attenuator, a VOA, a switch, or an add/drop element, or another element with attenuation or a combination of such elements. The attenuating element 28 has an attenuation which is greater than 10 dB, for example.

The purpose of separating GFF 26 and attenuating element 28 by a gain stage (i.e., gain stage $G_2$) is to achieve a high value for $T_{in-1}$ and also a low noise factor $F_{total}$. Since $T_i$ is in the denominator of Eqn. (1), keeping its value high keeps $F_{total}$ low. If the GFF and attenuating element were directly cascaded to one another within the amplifier system, their aggregate attenuation would result in either low values in $T_{in-1}$ and results in adversely affected overall noise factor $F_{total}$ of the amplifier or alternatively results in a poor power conversion efficiency. The present invention overcomes this problem by separating the GFF and attenuating element by a gain stage.

FIG. 2B schematically illustrates an alternative embodiment of the invention. The optical amplifier system 20 of FIG. 2B is similar to the amplifier system of FIG. 2A. The difference is that attenuating element 28 is located between gain stages $G_1$ and $G_2$ and GFF 26 is located between gain stages $G_2$ and $G_3$. The amplifier system 20 also achieves improved noise performance by avoiding the direct cascading of the attenuating element 28 and GFF 26.

The choice of which configuration is best (i.e., FIG. 2A or FIG. 2B) will depend on the spectral band of interest as well as other details of the amplifier design. Therefore, it will need to be determined on a case-by-case basis. Often it will be advantageous to put the GFF first since it typically has low insertion loss except near the gain peak(s). Therefore, signals at wavelengths away from the peak will be relatively unaffected, while those near the peak will likely receive considerable gain from the first stage. This arrangement gives the non-peak wavelengths an extra gain stage before they are subject to considerable attenuation. On the other hand, the gain of the first stage (which is typically very highly inverted) is often high in the blueband (i.e, approximately 1530 nm). However, if the amplifier is operated at an average inversion such that the filter is also compensating for a gain peak in the long wavelength portion of the Erbium gain band, it may be advantageous to put the attenuator/other component first if peak attenuation is less than that of the GFF's redband peak. The noise performance can be estimated using eqn (1) or well known numerical techniques. Since noise performance and pump to signal power are typically trade-offs with respect to the partitioning of gain among the various stages, a unique optimum cannot be defined a priori.

The present invention also applies when a very high attenuation GFF (peak attenuation, e.g., >10 dB) filter is needed. In this case, the GFF can be split into multiple filters whose composite attenuation is equal to the total attenuation spectrum which will provide the desired gain shaping performance. The various filters can then be inserted between multiple stages. The gain flattening filter would probably be split between gain stages so that the constituent filter had less peak attenuation than the aggregate flattening required. Alternatively, this split could be for the purpose of simplifying the fabrication of a difficult GFF.

An optical amplifier system 30 of this type is schematically illustrated in FIG. 3. Optical radiation to be amplified enters the amplifier system at the input port 32. The amplified radiation exits at the output port 34. The amplifier system 30 comprises three gain stages whose power gains are designated $G_1$, $G_2$ and $G_3$. Each gain stage may be an erbium doped optical waveguide segment which is pumped by a pumping laser.

In the system 30, $T_1$ represents the power transmission coefficient for all components (if any) between the input port 22 and the first gain stage $G_1$. There is a first gain flattening subfilter 36 between $G_1$ and $G_2$ and a second gain flattening subfilter 38 between the gain stages $G_2$ and $G_3$.

Some illustrative values for a particular embodiment of the system are as follows:

| | |
|---|---|
| peak after subfilter 36 | 7 dB @ 1530 nm |
| peak after subfilter 38 | 6 dB @ 1558 nm |

Each subfilter 36, 38 could be made using thin filter interference filter technology (or long period fiber gratings, etc.)

In this case, one should account for the spectral evolution of the gain among the various gain stages and insert the sub filters to keep the spectrally dependent noise factor as uniform as possible. In typical amplifiers with highly inverted front ends, this translates into attempting (to the extent permitted by the filter decompositions available) to attenuate the wavelengths near the Erbium fluorescence peak first and reserving the gain flattening attenuation of the longer wavelength regions (which build up total gain more slowly) for later in the amplifier.

Finally, the above described embodiments of the invention are intended to be illustrative only. Numerous alternative embodiments may be described by those skilled in the art without departing from the scope of the following claims.

What is claimed is:

1. An optical amplifier comprising:

multiple gain stages arranged serially for providing gain for an optical signal propagating therein, each gain stage comprising a pumped segment of optical waveguide, wherein said optical signals are at least in the 1530 nm to 1560 nm range;

first gain flattening filter reducing a variation in gain of said optical amplifier in a particular wavelength band, and a second gain flattening filter reducing a variation in gain of said optical amplifier, wherein one of said gain stages is located between said first gain flattening filter and said second gain flattening filter, such that no additional gain flattening filter is located directly adjacent to the first or the second gain flattening filter, wherein said multiple gain stages include a first gain stage $G_1$ that provides high gain of at least 15 dB.

2. An optical amplifier comprising:

multiple gain stages arranged serially for providing gain for an optical signal propagating therein, each gain stage comprising a pumped segment of optical waveguide, wherein said multiple gain stages include the first stage gain $G_1$ and wherein said optical signals are at least in the 1530 nm to 1560 nm range;

first gain flattening filter reducing a variation in gain of said optical amplifier in a particular wavelength band, and a second gain flattening filter reducing a variation in gain of said optical amplifier, wherein one of said gain stages is. located between said first gain flattening filter and said second gain flattening filter, such that no additional gain flattening filter is located directly adjacent to the first or the second gain flattening filter, wherein said gain $G_1$ is:

$15 dB \leq G_1 23\ 20 dB$.

3. The optical amplifier according to claim 1, wherein other gain stages provide gain that is 15 dB or smaller.

4. The optical amplifier according to claim 2, wherein other gain stages provide gain that is 15 dB or smaller.

5. An amplifier according to claim 1 further comprises an optical attenuation element.

6. The optical amplifier of claim 5 wherein each of said gain stages comprises an erbium doped optical waveguide segment.

* * * * *